United States Patent [19]

Groll et al.

[11] 4,267,107
[45] May 12, 1981

[54] REACTIVE DYESTUFFS

[75] Inventors: Manfred Groll, Cologne; Klaus Wunderlich, Leverkusen, both of Fed. Rep. of Germany

[73] Assignee: Bayer Aktiengesellschaft, Leverkusen, Fed. Rep. of Germany

[21] Appl. No.: 43,120

[22] Filed: May 29, 1979

Related U.S. Application Data

[63] Continuation of Ser. No. 919,312, Jun. 26, 1978, abandoned.

[30] Foreign Application Priority Data

Jun. 28, 1977 [DE] Fed. Rep. of Germany ....... 2729011

[51] Int. Cl.$^3$ .............................................. C09B 47/04
[52] U.S. Cl. ................................................. 260/242.2
[58] Field of Search ..................................... 260/242.2

[56] References Cited

U.S. PATENT DOCUMENTS

| | | | |
|---|---|---|---|
| 3,082,201 | 3/1963 | Koller | 260/242.2 X |
| 3,096,340 | 7/1963 | Tartter et al. | 260/242.2 X |
| 3,105,070 | 9/1963 | Bitterli | 260/242.2 |
| 3,126,377 | 3/1964 | Tartter et al. | 260/242.2 |
| 3,752,801 | 8/1973 | Hoelzle | 260/242.2 X |
| 3,989,692 | 11/1976 | Jager et al. | 260/242.2 X |

FOREIGN PATENT DOCUMENTS 1188606 4/1970 United Kingdom.
1208553 10/1970 United Kingdom.
1526840 10/1978 United Kingdom.
1549820 8/1979 United Kingdom.

Primary Examiner—Richard Raymond
Attorney, Agent, or Firm—Sprung, Felfe, Horn, Lynch & Kramer

[57] ABSTRACT

Phthalocyanine reactive dyestuffs of the formula

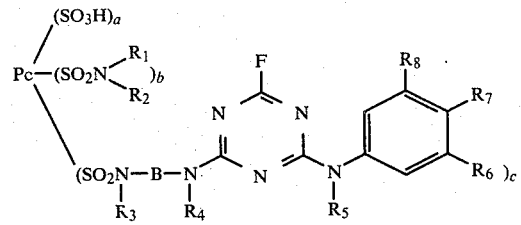

wherein
Pc, $R_1$, $R_2$, $R_3$, $R_4$, $R_5$, B, $R_6$, $R_7$, $R_8$, a, b and c have the meaning indicated in the description, and their use for dyeing textile materials containing hydroxyl groups and textile materials containing nitrogen, in particular textile materials made of natural and regenerated cellulose and furthermore made of wool, silk and synthetic polyamide fibers and polyurethane fibers. The resulting dyeings are distinguished by excellent fastness to wet processing.

3 Claims, No Drawings

REACTIVE DYESTUFFS

This is a continuation of application Ser. No. 919,312, filed June 26, 1978, now abandoned.

The invention relates to new water-soluble phthalocyanine dyestuffs which, in the form of their free acids, correspond to the formula $$Pc \begin{pmatrix} (SO_3H)_a \\ \left(SO_2N\begin{matrix}R_1\\R_2\end{matrix}\right)_b \\ \left(SO_2N-B-N\begin{matrix}\\\\R_3\end{matrix}\begin{matrix}\\\\R_4\end{matrix}\begin{matrix}F\\\\N\end{matrix}\begin{matrix}\\\\N\end{matrix}\begin{matrix}\\\\R_5\end{matrix}\begin{matrix}R_8\\\\R_7\\H\\R_6\end{matrix}\right)_c \end{pmatrix} \quad (I)$$

wherein
Pc = the radical of a copper phthalocyanine or nickel phthalocyanine,
$R_1$ and $R_2$ = H or optionally substituted alkyl,
$R_3$, $R_4$ and $R_5$ = H or optionally substituted alkyl,
$R_6$, $R_7$ and $R_8$ = H, $C_1$-$C_4$-alkyl, $C_1$-$C_4$-alkoxy, $SO_3H$ or COOH, with the proviso that at least one of the radicals = $SO_3H$ or COOH,
B = a bridge member,
a = 1 to 3;
b = 0 to 2;
c = 1 or 2 and
a + b + c ≦ 4.
and their mixtures as well as processes for their preparation and use.

Each sulphonic acid or sulphonamide group in the dye-stuffs of the formula (I) is bonded to a different benzene ring of the phthalocyanine, in the 3-position or 4-position.

The radicals $R_1$ and $R_2$; $R_3$-$R_5$ and $R_6$-$R_8$ can be identical or different.

Examples which may be mentioned of optionally substituted alkyl radicals $R_1$ and $R_2$ are: $C_1$-$C_5$-alkyl radicals, such as methyl, ethyl, propyl, butyl and amyl, β-hydroxyethyl and γ-hydroxypropyl, β-carboxyethyl and β-sulphoethyl.

Examples of optionally substituted alkyl radicals $R_3$, $R_4$ and $R_5$ are, besides hydrogen, $C_1$-$C_5$-alkyl radicals, such as methyl, ethyl and propyl radicals, β-hydroxyethyl and γ-hydroxypropyl.

The bridge members B can be of an aromatic, aliphatic or araliphatic nature. They can be optionally substituted, for example by $C_1$-$C_4$-alkyl groups, $C_1$-$C_4$-alkoxy groups, halogen atoms, sulpho groups or carboxyl groups, or interrupted by keto groups, sulphone groups, carboxamido groups, urea groups, sulphonamide groups, amino groups, imino groups or oxygen atoms.

Examples which may be mentioned of aromatic bridge members are: 1,2-phenylene, 1,3-phenylene-, 1,4-phenylene, 1,4-naphthylene, 1,5-naphthylene, 4-methyl-1,4-phenylene, 2-methyl-1,4-phenylene, 2-methyl-5-chloro-1,4-phenylene, 4-methoxy-1,3-phenylene, 3-methoxy-1,4-phenylene, 4-chloro-1,3-phenylene, 2-chloro-1,4-phenylene, 5-carboxamido-1,3-phenylene, 2-carboxy-1,4-phenylene, 2-carboxy-1,5-phenylene, 3-carboxy-1,5-phenylene, 4-sulpho-1,3-phenylene, 3-sulpho-1,4-phenylene and 2-methyl-5-sulpho-1,3-phenylene.

Examples which may be mentioned of aliphatic bridge members are:

—CH₂—CH₂—, —CH₂—CH(CH₃)—, —CH₂—CH₂—CH₂—,

—CH₂—CH(CH₃)—CH₂—, —CH₂—CH₂—CH₂—CH₂—,

—CH(CH₃)—CH₂—CH₂—CH₂—, —CH₂—CH(CH₃)—CH₂—CH₂—,

—CH₂—CH₂—CH₂—CH₂—CH₂—,

—CH(CH₃)—CH₂—CH₂—CH₂—CH₂— and

—CH₂—CH₂—CH₂—CH₂—CH₂—CH₂—,

Further examples of bridge members which may be mentioned are:

—CH₂—C₆H₄— (para), —CH₂—C₆H₄— (meta),

—CH₂—CH₂—NH—CO—NH—C₆H₄— (para),

—CH₂—CH₂—NH—CO—NH—C₆H₄— (meta),

—CH₂—CH₂—NH—CO—C₆H₄— (para),

—C₆H₄—O—C₆H₄—,

—C₆H₄—CO—C₆H₄—, and cyclohexyl(SO₃H)—NH—C₆H₄—.

Those dyestuffs of the general formula (I) wherein
Pc = the radical of a copper phthalocyanine or nickel phthalocyanine,
$R_1$, $R_2$, $R_3$ and $R_4$ = hydrogen, methyl or ethyl,
$R_5$ = hydrogen,
B = 1,2-phenylene, 1,3-phenylene, 1,4-phenylene or $C_2$-$C_6$-alkylene (straight-chain or branched), optionally substituted by $C_1$-$C_4$-alkyl groups, $C_1$-$C_4$-alkoxy groups or halogen atoms, $R_6$, $R_7$ and $R_8$=hydrogen, methyl, ethyl, methoxy, $SO_3H$ or $COOH$, at least one of these radicals being $SO_3H$ or $COOH$.

a=1-3;
b=0-2;
c=1; and
a+b+c=2-4, form a preferred group within the dyestuffs according to the invention.

Those dyestuffs of the general formula (I) wherein
Pc=the radical of a copper phthalocyanine or nickel phthalocyanine,
$R_1$, $R_2$, $R_3$ and $R_4$=hydrogen, methyl or ethyl,
$R_5$=hydrogen,
B=1,2-phenylene, 1,3-phenylene, 1,4-phenylene or $C_2$-$C_6$-alkylene (straight-chain or branched), optionally substituted by $C_1$-$C_4$-alkyl groups, $C_1$-$C_4$-alkoxy groups or halogen atoms,
$R_6$, $R_7$ and $R_8$=hydrogen, methyl, ethyl, methoxy, $SO_3H$ or $COOH$, at least one of these radicals being $SO_3H$ or $COOH$.

$1<a<3$,
$b<0$,
c=1; and
a+b+c=3 or 4, form a particularly preferred group within the dyestuffs according to the invention.

Those dyestuffs of the general formula (I) wherein
Pc=the radical of a copper phthalocyanine or nickel phthalocyanine,
$R_3$ and $R_4$=hydrogen, methyl or ethyl,
$R_5$=hydrogen,
B=1,2-phenylene, 1,3-phenylene, 1,4-phenylene or $C_2$-$C_6$-alkylene (straight-chain or branched), optionally substituted by $C_1$-$C_4$-alkyl groups, $C_1$-$C_4$-alkoxy groups or halogen atoms,
$R_6$, $R_7$ and $R_8$=hydrogen, methyl, ethyl, methoxy, $SO_3H$ or $COOH$, at least one of these radicals being $SO_3H$ or $COOH$.

a=1 or 2,
b=0,
c=1 and
a+c=2 or 3 also form a particularly preferred group within the dyestuffs according to the invention.

The new dyestuffs of the formula (I) are prepared by condensation of suitable starting components. The most advantageous process consists in reacting dyestuffs which, in the form of their free acids, correspond to the formula

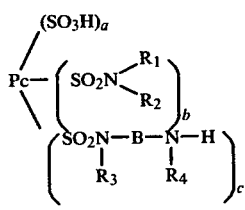
(II)

with compounds of the general formula

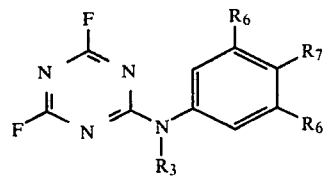
(III)

wherein
Pc, $R_1$, $R_2$, $R_3$, $R_4$, $R_5$, $R_6$, $R_7$, $R_8$, B, a, b and c have the meaning indicated above.

However, it is also possible first to react the dyestuffs of the formula (II) with trifluorotriazine and to react the resulting intermediate product with a compound of the formula

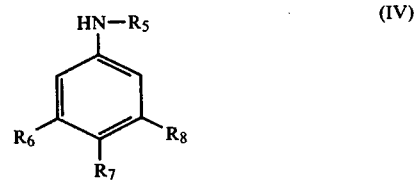
(IV)

wherein
$R_5$, $R_6$, $R_7$ and $R_8$ have the meaning indicated above.

These reactions are acylation reactions and can be carried out in an aqueous, aqueous-organic or organic, preferably weakly acid to weakly alkaline, medium at temperatures from $-10°$ C. to $+80°$ C., preferably $-5°$ C. to $+10°$ C.

The phthalocyanine compounds of the formula (II) used in the process according to the invention can be prepared by reacting a phthalocyaninesulphonic acid chloride, preferably in the form of an aqueous suspension, of the formula

(V)

wherein
Pc has the meaning indicated above,
m designates the numbers 0, 1 or 2 and
n designates the numbers 2, 3 or 4, the sum of m and n being not greater than 4, with diamines or, preferably, monoacylated diamines of the formula

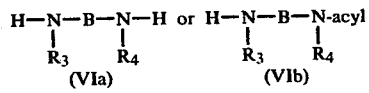

and optionally with a compound of the formula

(VII)

wherein
$R_1$, $R_2$, $R_3$ and $R_4$ have the meaning indicated above, and, if monoacylated diamines of the formula (VIb) are used, subjecting the terminal acylamino group of the resulting phthalocyanine compounds to acid or alkaline saponification. Unreacted sulphonic acid chloride groups are converted into sulphonic acid groups in this reaction.

Phthalocyaninesulphonyl chlorides and phthalocyaninesulphonyl chloride-sulphonic acids of the formula (V) can be obtained by treating the corresponding phthalocyanine or the phthalocyaninesulphonic acid with chlorosulphonic acid and, if appropriate, an acid halide, such as thionyl chloride, phosphorus pentachloride, phosphorus oxychloride or phosphorus trichloride, as described in British Pat. Nos. 708,543, 784,834 and 785,629 and in U.S. Pat. No. 2,219,330.

Uniform phthalocyanine dyestuffs can be used according to the invention, that is to say those in which the letters a, b and c characterise the numbers 0, 1, 2 or 3. In addition, however, mixtures of these dyestuffs can also be used. Mixtures of this type sometimes show particular advantages with respect to solubility and substantivity. In such mixtures, the averaged value of the numbers varies.

Mixtures of this type according to the invention are prepared, for example, from two or more, in each case uniform, end dyestuffs of the formula (I), or particularly advantageously by using a mixture of starting components. The latter is frequently automatically formed, since the phthalocyaninesulphinic acid chloride-sulphonic acids (V) are frequently obtained industrially in the form of mixtures with respect to the degree of sulphonation and their proportion of sulphonic acid chloride groups and sulphonic acid groups.

Examples which may be mentioned of suitable monoacylated diamines of the formula (VIb) and suitable diamines of the formula (VIa) are: 2-amino-acetanilide, 3-aminoformanilide, 3-aminoacetanilide, 4-aminoformanilide, 4-aminoacetanilide, 1-amino-4-acetylaminonaphthalene, 1-amino-5-acetylaminonaphthalene, 3-aminophenyloxymic acid, 4-methyl-3-aminoacetanilide, 4-methyl-3-amino-phenyloxamic acid, 5-chloro-4-amino-2-methyl-acetanilide, 4-methoxy-3-amino-acetanilide, 4-amino-3-methoxy-acetanilide, 4-amino-2,5-dichloro-acetanilide, N-methyl-N-4-aminophenyl-acetamide, 4-amino-2-chloro-acetanilide, 4-acetylamino-2-amino-benzoic acid, 5-acetylamino-2-amino-benzoic acid, 1,4-diaminobenzene-2-sulphonic acid, 1,3-diaminobenzene-3-sulphonic acid, 5-acetylamino-3-aminobenzoic acid, monoacetylethylenediamine, monoacetyl-propylene-1,3-diamine, monoacetylbutylene-1,4-diamine, N-methyl-N-3-aminopropyl-acetamide, N-methyl-N-$\beta$-methylaminoethylacetamide and B-($\beta$-aminoethyl)-N'-(3-aminophenyl)-urea.

The new dyestuffs are extremely valuable products which are suitable for the most diverse application purposes. As water-soluble compounds, they are of interest for dyeing textile materials containing hydroxyl groups and textile materials containing nitrogen, in particular textile materials made of natural and regenerated cellulose, and furthermore made of wool, silk and synthetic polyamide fibres and polyurethane fibres. They are particularly suitable for use as reactive dyestuffs for dyeing cellulose materials by techniques which have recently been disclosed for this. The resulting fastness properties, in particular fastness to wet processing, are excellent.

For dyeing cellulose, the dyestuffs are preferably employed in an aqueous solution, to which substances having an alkaline reaction, such as alkali metal hydroxide or alkali metal carbonate, or compounds which are converted into substances having an alkaline reaction, such as alkali metal bicarbonate or $Cl_3C$—COONa, can be added. Further auxiliaries can be added to the solution, but they should not react with the dyestuffs in an undesired manner. Examples of such additives are surface-active substances, such as alkylsulphates, or substances which prevent migration of the dyestuff or dyeing auxiliaries, such as urea, or inert thickeners, such as oil-in-water emulsions, tragacanth, starch, alginate or methylcellulose.

The solutions or pastes thus prepared are applied, for example by padding on a padder (short liquor) or by printing, onto the material to be dyed and are then heated to an elevated temperature, preferably 40° to 150° C., for some time. The heating can be carried out in a hot flue, in a steam apparatus, on heated rollers or by introducing the material into heated concentrated salt baths, either a single process or any desired sequence of successive processes being carried out.

If a padding or dye liquor without alkali is used, the dry goods are subsequently passed through a solution having an alkaline reaction, to which sodium chloride or sodium sulphate decahydrate is added. The salt addition in this case decreases the migration of the dyestuff from the fibre.

The material to be dyed can also be pretreated with one of the abovementioned acid-binding agents and then treated with the solution or paste of the dyestuff and finally, as indicated, the dyestuff is fixed at elevated temperature.

For dyeing from a long liquor, the material is introduced into an aqueous solution of the dyestuff (liquor ratio 1:5 to 1:40) at room temperature and dyeing is carried out for 40 to 90 minutes, if appropriate increasing the temperature up to 95° C. and if appropriate adding, in portions, a salt, for example sodium sulphate, and then alkali, for example sodium phosphates, sodium carbonate, NaOH or KOH.

The chemical reaction between dyestuff and fibre occurs here. After the chemical fixing has ended, the dyed material is rinsed hot and then soaped, non-fixed residues of the dyestuff being removed. Dyeings which are outstandingly fast, in particular fast to wet processing and light, are obtained.

In the so-called pad-cold batch process, subsequent heating of the padded fabric can be spared by storing the fabric at room temperature for some time, for example 2 to 20 hours. In this process, a stronger alkali is used than in the dyeing process, described above, from a long liquor.

For printing materials containing hydroxyl groups, a printing paste consisting of the dyestuff solution, a thickener, such as sodium alginate, and a compound which has an alkaline reaction or which splits off an alkali on heating, such as sodium carbonate, sodium phosphate, potassium carbonate, potassium acetate or sodium bicarbonate and potassium bicarbonate, is used and the printed material is rinsed and soaped.

Textile materials containing amine groups, such as wool, silk and synthetic polyamide fibres and polyurethane fibres, are in general dyed, in an acid to neutral region, by dyeing methods which are customary for these materials.

The dyeings obtainable with the new dyestuffs are in general distinguished by good to very good fastness properties, in particular by excellent fastness to wet processing.

EXAMPLE 1

3.46 g of 3-aminobenzene-sulphonic acid are dissolved in 150 ml of water at pH 3.5, a little sodium hydroxide solution being added. 2.9 g of 2,4,6-trifluoro-triazine are added dropwise to this solution at 0°–5° in the course of 5 minutes, whilst maintaining a pH value of 3.2–3.6 with the aid of 1 N NaHCO$_3$ solution, and the mixture is subsequently stirred at 0°–5° C. for a further 5 minutes, whilst maintaining the pH value indicated. 19.68 g of the dyestuff of the formula

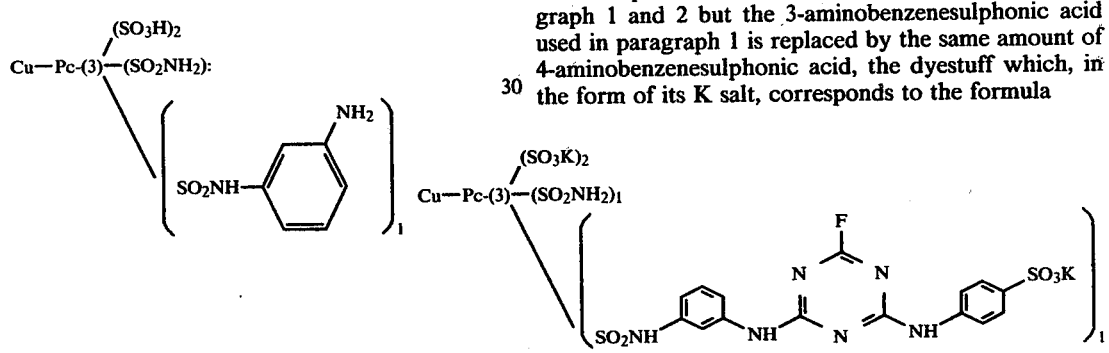

(obtained by reacting Cu-Pc-(3)-(SO$_2$Cl/SO$_3$H)$_4$ with 3-aminoformanilide and ammonia and then saponifying the formylamino group) are dissolved in 400 parts of water at pH 6 with the aid of sodium hydroxide solution. After cooling the solution, the difluorotriazinylaminobenzenesulphonic acid solution obtained according to paragraph 1 is allowed to run in at 0°–5° C. in the course of 5 minutes, whilst maintaining a pH value of 6.0–6.5. After the condensation reaction has ended, the dyestuff is salted out with KCl, filtered off, rinsed with dilute KCl solution and dried at 50°–60° C. The dyestuff which, in the form of its K salt, corresponds to the formula

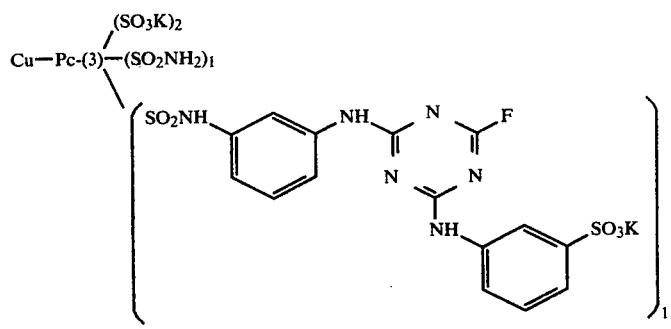

is obtained in virtually quantitative yield. It dyes cotton in turquoise blue shades.

If the procedure followed is as described in paragraph 1 and 2 but the 3-aminobenzenesulphonic acid used in paragraph 1 is replaced by the same amount of 4-aminobenzenesulphonic acid, the dyestuff which, in the form of its K salt, corresponds to the formula and which dyes cotton in turquoise blue shades is obtained, also in virtually quantitative yield.

Further valuable reactive dyestuffs are obtained in an analogous manner if the aminobenzenesulphonic acids mentioned in column 3 of Table 1 which follows are acylated with 2,4,6-trifluoro-1,3,5-triazine and the resulting difluorotriazinylaminophenylsulphonic acid is subjected to a condensation reaction with the aminophthalocyanine derivatives formulated in column 2.

TABLE 1

| No. | Aminophthalocyanine derivative | Aminobenzenesulphonic acid | Colour shade on cellulose |
|---|---|---|---|
| (1) | Cu—Pc-(3)—(SO$_3$Na)$_2$/(SO$_2$NH$_2$)$_1$\(SO$_2$NH—C$_6$H$_4$—NH$_2$)$_1$ | 3-aminobenzenesulphonic acid | turquoise blue |
| (2) | Cu—Pc-(3)—(SO$_3$Na)$_2$/(SO$_2$NH—CH$_3$)$_1$\(SO$_2$NH—C$_6$H$_4$(NH$_2$))$_1$ | 3-aminobenzenesulphonic acid | turquoise blue |

TABLE 1-continued

| No. | Aminophthalocyanine derivative | Aminobenzenesulphonic acid | Colour shade on cellulose |
|---|---|---|---|
| (3) | Cu—Pc-(3) with (SO$_3$Na)$_2$, (SO$_2$N(CH$_3$)$_2$)$_1$, (SO$_2$NH—C$_6$H$_3$(NH$_2$))$_1$ | 3-aminobenzenesulphonic acid | turquoise blue |
| (4) | Cu—Pc-(3) with (SO$_3$Na)$_2$, (SO$_2$NH$_2$)$_1$, (SO$_2$NH—C$_6$H$_2$(SO$_3$Na)(CH$_3$)(NH$_2$))$_1$ | 4-aminobenzenesulphonic acid | turquoise blue |
| (5) | Cu—Pc-(3) with (SO$_3$Na)$_2$, (SO$_2$NH$_2$)$_1$, (SO$_2$NH—C$_6$H$_3$(COONa)(NH$_2$))$_1$ | 3-aminobenzenesulphonic acid | turquoise blue |
| (6) | Cu—Pc-(3) with (SO$_3$Na)$_2$, (SO$_2$NH—C$_6$H$_4$—NH$_2$)$_1$ | 3-aminobenzenesulphonic acid | turquoise blue |
| (7) | Ni—Pc-(3) with (SO$_3$Na)$_2$, (SO$_2$NH—C$_6$H$_4$—NH$_2$)$_1$ | 3-aminobenzenesulphonic acid | bluish-tinged green |
| (8) | Ni—Pc-(3) with (SO$_3$Na)$_3$, (SO$_2$NH—C$_6$H$_4$—NH$_2$)$_1$ | 3-aminobenzenesulphonic acid | bluish-tinged green |
| (9) | Cu—Pc-(3) with (SO$_3$Na)$_2$, (SO$_2$N(CH$_3$)$_2$)$_1$, (SO$_2$NH—C$_6$H$_4$—NH$_2$)$_1$ | 1-aminobenzene-3,4-disulphonic acid | turquoise blue |
| (10) | Cu—Pc-(4) with (SO$_3$Na)$_2$, (SO$_2$NH$_2$)$_1$, (SO$_2$NH—C$_6$H$_4$—NH$_2$)$_1$ | 3-aminobenzenesulphonic acid | turquoise blue |

TABLE 1-continued

| No. | Aminophthalocyanine derivative | Aminobenzenesulphonic acid | Colour shade on cellulose |
|---|---|---|---|
| (11) | Cu—Pc-(3)(SO₃Na)₂(SO₂NH₂)₁(SO₂NH—C₆H₄—NH₂)₁ | 3-amino-4-methyl-benzenesulphonic acid | turquoise blue |
| (12) | Cu—Pc-(3)(SO₃Na)₂(SO₂NH₂)₁(SO₂NH—C₆H₄—NH₂)₁ | 4-amino-2-methyl-benzenesulphonic acid | turquoise blue |
| (13) | Cu—Pc-(3)(SO₃Na)₁(SO₂NH₂)₁(SO₂NH—C₆H₄—NH₂)₁ | 5-amino-2-methyl-benzenesulphonic acid | turquoise blue |

EXAMPLE 2

3.5 g of 3-aminobenzoic acid are dissolved in 150 ml of water, 17 ml of 1 N hydrochloric acid being added. 3.5 g of 2,4,6-trifluoro-1,3,5-triazine are added dropwise at 0°–3° C. in the course of 15 minutes, the pH value of the suspension formed being kept at 3.0–4.0 by simultaneously adding 1 N NaHCO₃ solution.

19.68 g of the dyestuff of the formula

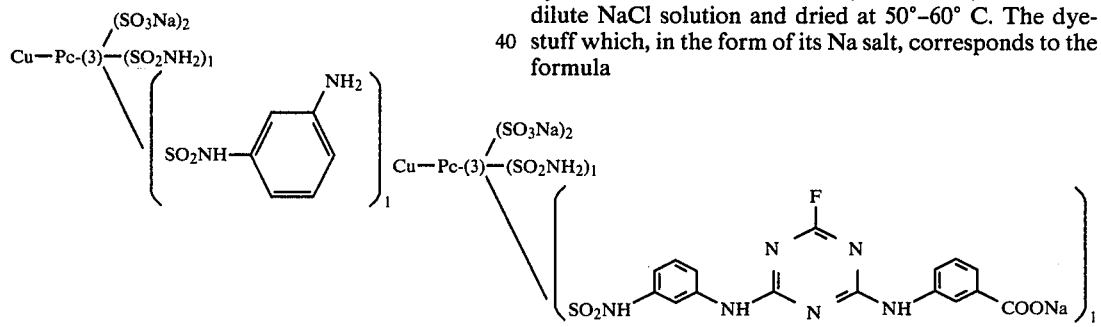

(obtained by reacting Cu-Pc-(3)-(SO₂Cl/SO₃H)₄ with 3-aminoformanilide and ammonia and then saponifying the formylamino group) are dissolved in 400 ml of water at pH 6 with the aid of sodium hydroxide solution. After cooling the solution, the suspension of difluorotriazinylaminobenzoic acid obtained according to paragraph 1 is allowed to run in at 0°–5° C. in the course of 15 to 20 minutes, whilst maintaining a pH value of 6.0–7.0. After the condensation reaction has ended, the dyestuff is salted out with NaCl, filtered off, rinsed with dilute NaCl solution and dried at 50°–60° C. The dyestuff which, in the form of its Na salt, corresponds to the formula

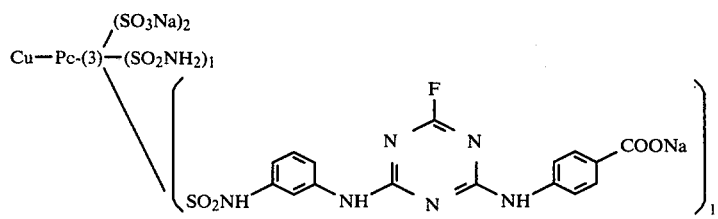

is obtained in virtually quantitative yield. It dyes cotton in turquoise blue shades.

If the procedure followed is as described in paragraph 1 and 2 but 25 ml of 1 N hydrochloric acid and 3.5 g of 4-aminobezoic acid are used in the acylation of the triazine (paragraph 1), the dyestuff of the formula is obtained, also in virtually quantitative yield. The dyestuff dyes cotton in turquoise blue shades.

Further valuable reactive dyestuffs are obtained in an analogous manner if the aminobenzoic acid given in column 3 of Table 2 which follows are acylated with 2,4,6-trifluoro-1,3,5-triazine and the resulting difluorotriazinylaminobenzoic acids are subjected to a condensation reaction with the aminophthalocyanine derivatives given in column 2.

TABLE 2

| No. | Aminophthalocyanine derivative | Aminobenzoic acid | Colour shade on cellulose |
|---|---|---|---|
| (1) | $Cu-Pc-(3)$ $(SO_3Na)_2$ / $(SO_2NH-C_6H_4-NH_2)_1$ | 3-aminobenzoic acid | turquoise blue |
| (2) | $Ni-Pc-(3)$ $(SO_3Na)_2$ / $(SO_2NH-C_6H_4-NH_2)_1$ | 3-aminobenzoic acid | bluish-tinged green |
| (3) | $Cu-Pc-(3)-(SO_2NH_2)_1$ $(SO_3Na)_2$ / $(SO_2NH-C_6H_3(COONa)-NH_2)_1$ | 4-aminobenzoic acid | turquoise blue |
| (4) | $Cu-Pc-(3)-(SO_2NH-CH_3)_1$ $(SO_3Na)_2$ / $(SO_2NH-C_6H_4-NH_2)_1$ | 3-aminobenzoic acid | turquoise blue |
| (5) | $Cu-Pc-(3)-(SO_2NH_2)_1$ $(SO_3Na)_2$ / $(SO_2NH-C_6H_4-NH_2)_1$ | 4-aminobenzoic acid | turquoise blue |
| (6) | $Cu-Pc-(4)-(SO_2NH_2)_1$ $(SO_3Na)_2$ / $(SO_2NH-C_6H_4-NH_2)_1$ | 4-aminobenzoic acid | turquoise blue |
| (7) | $Cu-Pc-(3)-(SO_2NH_2)_1$ $(SO_3Na)_2$ / $(SO_2NH-C_6H_4-NH_2)_1$ | 4-aminophthalic acid | turquoise blue |
| (8) | $Ni-Pc-(3)$ $(SO_3Na)_3$ / $(SO_2NH-C_6H_4-NH_2)_1$ | 3-aminobenzoic acid | bluish-tinged green |
| (9) | $Cu-Pc$ $(SO_3Na)_2$ / $(SO_2N(CH_3)_2)_1$ \ $(SO_2NH-C_6H_4-NH_2)_1$ | 3-aminobenzoic acid | turquoise blue |

TABLE 2-continued

| No. | Aminophthalocyanine derivative | Aminobenzoic acid | Colour shade on cellulose |
|---|---|---|---|
| (10) | 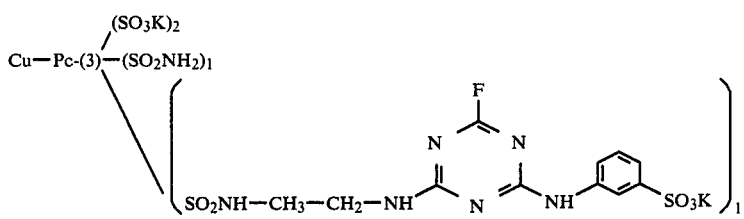 | 4-aminobenzoic acid | turquoise blue |

EXAMPLE 3

3.46 g of 3-aminobenzenesulphonic acid are dissolved in 150 ml of water at pH 3.5, a little sodium hydroxide solution being added. 2.9 g of 2,4,6-trifluoro-1,3,5-triazine are added dropwise to this solution at 0°–5° C. in the course of 5 minutes, a pH value of 3.2–3.6 being maintained with the aid of 1 N NaHCO$_3$ solution, and the mixture is subsequently stirred at 0°–5° C. for a further 5 minutes, whilst maintaining the pH value indicated.

19.02 g of the dyestuff of the formula

Cu—Pc-(3)—(SO$_3$H)$_2$ / SO$_2$NH$_2$)$_1$ \ (SO$_2$NH—CH$_2$—CH$_2$—NH$_2$)$_1$ (obtained by reacting Cu-Pc-(3)-(SO$_2$Cl/SO$_3$H)$_4$ with monoacetylethylenediamine and ammonia and then saponifying the acetylamino group) are dissolved in 300 ml of water at pH 8.5 with the aid of sodium hydroxide solution. After cooling the solution, the difluoro-triazinylaminobenzenesulphonic acid solution obtained according to paragraph 1 is allowed to run in at 0°–5° C. in the course of 10 minutes, whilst maintaining a pH value of 8.0–8.5. After the condensation reaction has ended, the pH value of the solution is adjusted to 6 and the dyestuff is salted out with KCl, filtered off, rinsed with dilute KCl solution and dried at 50°–60° C. The dyestuff which, in the form of its K salt, corresponds to the formula

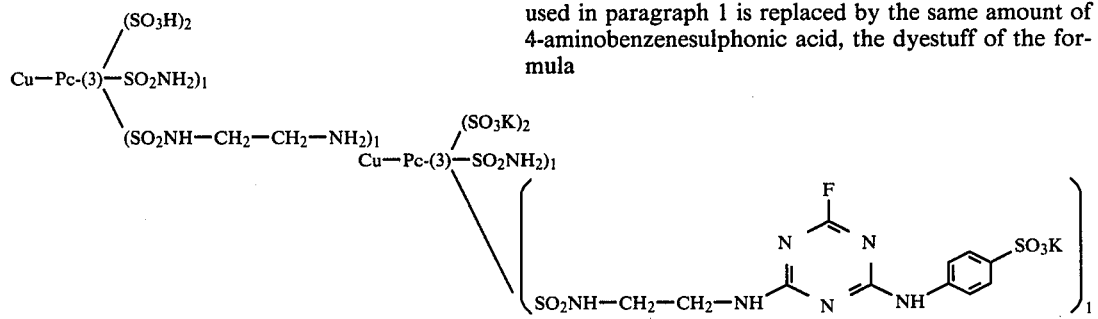

is obtained in very good yield. The dyestuff dyes cotton in turquoise blue shades.

If the procedure followed is as described in paragraph 1 and 2 but the 3-aminobenzenesulphonic acid used in paragraph 1 is replaced by the same amount of 4-aminobenzenesulphonic acid, the dyestuff of the formula

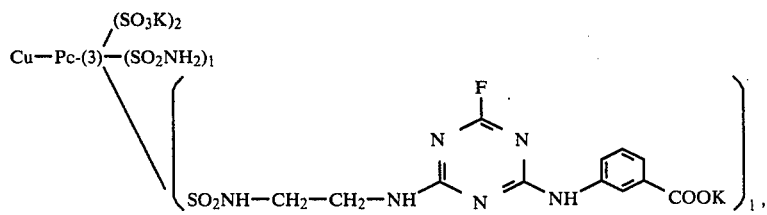

is obtained, also in very good yield. It dyes cotton in turquoise blue shades.

If the procedure followed is analogous to that in paragraph 2 but the aminophthalocyanine derivative used there is reacted with the suspension of difluoro-triazinyl-aminobenzoic acid obtained according to Example 2, paragraph 1, the dyestuff of the formula Cu—Pc-(3) /(SO$_3$K)$_2$ —(SO$_2$NH$_2$)$_1$ \ (SO$_2$NH—CH$_2$—CH$_2$—NH—[triazinyl-F]—NH—C$_6$H$_4$—COOK)$_1$, which also dyes cotton in turquoise blue shades is obtained.

are subjected to a condensation reaction with the aminophthalocyanine derivatives given in column 2.

TABLE 3

| No. | Aminophthalocyanine derivative | Amino acid | Colour shade on cellulose |
|---|---|---|---|
| (1) | Cu—Pc-(3)$\diagup$(SO$_3$K)$_2$ $\diagdown$(SO$_2$NH—CH$_2$—CH$_2$—NH$_2$)$_1$ | 3-aminobenzenesulphonic acid | turquoise blue |
| (2) | Cu—Pc-(3)$\diagup$(SO$_3$K)$_2$ —SO$_2$NH$_2$)$_1$ $\diagdown$(SO$_2$NH—⟨C$_6$H$_4$⟩—NH—CH$_3$)$_1$ | 3-aminobenzenesulphonic acid | turquoise blue |
| (3) | Cu—Pc-(3)$\diagup$(SO$_3$K)$_2$ —(SO$_2$NH$_2$)$_1$ $\diagdown$(SO$_2$N(CH$_3$)—CH$_2$—CH$_2$—N(CH$_3$)—N)$_1$ | 4-aminobenzenesulphonic acid | turquoise blue |
| (4) | Cu—Pc-(3)$\diagup$(SO$_3$K)$_2$ $\diagdown$(SO$_2$N(CH$_3$)—CH$_2$—CH$_2$—N(CH$_3$)—H)$_1$ | 3-aminobenzoic acid | turquoise blue |
| (5) | Cu—Pc-(3)$\diagup$(SO$_3$K)$_2$ —(SO$_2$NH$_2$)$_1$ $\diagdown$(SO$_2$NH—(CH$_2$)$_4$—NH$_2$)$_1$ | 4-aminobenzenephonic acid | turquoise blue |
| (6) | Cu—Pc-(3)$\diagup$(SO$_3$K)$_2$ $\diagdown$(SO$_2$NH—CH$_2$—CH$_2$—NH$_2$)$_1$ | 4-aminobenzoic acid | turquoise blue |
| (7) | Cu—Pc-(3)$\diagup$(SO$_3$K)$_2$ —(SO$_2$NH$_2$)$_1$ $\diagdown$(SO$_2$NH—CH$_2$—CH$_2$—NH$_2$)$_1$ | 3-amino-4-methyl-benzenesulphonic acid | turquoise blue |
| (8) | Cu—Pc-(3)$\diagup$(SO$_3$K)$_2$ $\diagdown$(SO$_2$NH—CH$_2$—CH$_2$—NH$_2$)$_1$ | 4-amino-3-chlorobenzenesulphonic acid | turquoise blue |
| (9) | Cu—Pc-(3)$\diagup$(SO$_3$K)$_2$ —(SO$_2$NH$_2$)$_1$ $\diagdown$(SO$_2$NH—(CH$_2$)$_3$—N(CH$_3$)—H)$_1$ | 5-amino-3-methyl-benzenesulphonic acid | turquoise blue |
| (10) | Cu—Pc-(3)$\diagup$(SO$_3$K)$_2$ —(SO$_2$NH—CH$_3$)$_1$ $\diagdown$(SO$_2$NH—CH$_2$—CH$_2$—NH$_2$)$_1$ | 3-aminobenzenesulphonic acid | turquoise blue |

Further valuable reactive dyestuffs are obtained in an analogous manner if the aminobenzenesulphonic acids or aminobenzoic acids given in column 3 of Table 3 which follows are acylated with 2,4,6-trifluoro-1,3,5-triazine and the resulting difluorotriazine derivatives

DYEING EXAMPLE 1

220 ml of water at a temperature of 20°–25° C. are initially introduced into a dyeing beaker of 500 ml capacity, which is in a waterbath which can be heated. 0.3 g of the dyestuff obtained according to Example 1, paragraph 2 is mixed thoroughly into a paste with 2 ml of cold water, and 48 ml of hot water (70° C.) are added. The dyestuff solution, which has a pH value of 7–8, is added to the water initially intoduced, 10 g of cotton yarn being continuously kept in motion in this dye liquor. The temperature of the dye liquor is increased to 60° C. in the course of 10 minutes, 15 g of sodium sulphate (anhydrous) are added and dyeing is continued for 30 minutes. 2 g of sodium carbonate are then added to the dye liquor and dyeing is carried out at 60° C. for 60 minutes. The dyed material is then removed from the dye liquor, the adhering liquor is removed by wringing out or squeezing off and the material is rinsed thoroughly, first with cold water and then with hot water, until the rinsing liquor is no longer stained. The dyed material is then soaped in 500 ml of a liquor containing 0.5 g of sodium alkylsulphonate for 20 minutes at the boiling point, again and dried in a drying cabinet at 60°–70° C. The cotton is dyed in a clear turquoise blue shade which is fast to wet processing.

DYEING EXAMPLE 2

3 g of the dyestuff which is obtained according to Example 1, paragraph 2, are stirred with 5 g of urea and 1 g of sodium m-nitrobenzene-sulphonate, and the mixture is mixed thoroughly into a paste with 10 ml of water at a temperature of 20°–25° C. and dissolved with 80 ml of water, at a temperature of 20° C., at pH 7–8, whilst stirring. 20 ml of a 10% strength sodium carbonate solution are added to this solution. 20 g of cotton fabric are padded with the padding liquor thus obtained on a laboratory padder, the rollers of which are pressed against one another with a pressure such that the liquor pick-up of the cotton fabric is about 80% of its dry weight. The fabric thus padded is stretched across a stenter frame, dried at 60°–70° C. for 15 minutes in a drying cabinet and then steamed at 102° C. for 3 minutes. The dyed material is then rinsed thoroughly, first with cold water and then with hot water, until the rinsing liquor is no longer stained. The dyed material is then soaped in 500 ml of a liquor containing 0.5 g of sodium alkylsulphonate for 20 minutes at the boiling point, again and dried at 60°–70° C. in a drying cabinet.

The dyestuff is absorbed to give a clear turquoise blue shade which is fast to wet processing.

DYEING EXAMPLE 3

A 20 g hank of wool is introduced, at 40° C., into a dyebath which consists of 0.5 g of the dyestuff obtained according to Example 1, paragraph 2 (dissolved at pH 7–8) 3.0 g of a polyglycol ether, prepared according to DAS (German Published Specification) No. 1,041,003, Example 9, 5.0 g of sodium sulphate and 1.2 g of 30% strength acetic acid per liter, and the bath is warmed to 80° C. in the course of 15 minutes. The bath is allowed to remain at this temperature for 30 minutes and then warmed to the boiling point and this temperature is maintained for about one hour. After rinsing the wool with water, a turquoise blue dyeing which is fast to potting and milling is obtained.

PRINTING EXAMPLE

A piece of cotton is printed with a printing paste consisting of 50 g of the dyestuff of Example 1, paragraph 2, 150 g of urea, 20 g of sodium bicarbonate, 10 g of sodium m-nitrobenzene-sulphonate, 450 g of a highly viscous alginate thickener and 320 g of water and steamed in a steamer, for example of the Mather-Platt type, at 103° C. The print is then rinsed with cold water, then with hot water and finally again with cold water. A turquoise blue print which is fast to wet processing is obtained.

We claim:

1. Phthalocyanine reactive dyestuffs of the formula

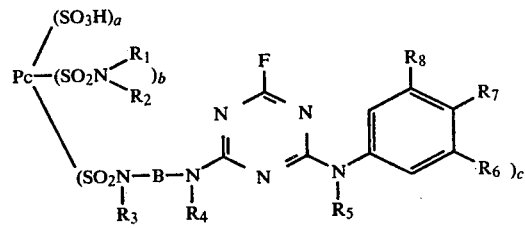

wherein
Pc = the radical of a copper phthalocyanine or nickel phthalocyanine,
$R_1$, $R_2$, $R_3$ and $R_4$ = hydrogen, methyl or ethyl,
$R_5$ = hydrogen,
B = 1,2-phenylene, 1,3-phenylene, 1,4-phenylene or $C_2$–$C_6$-alkylene (straight-chain or branched), optionally $C_1$–$C_4$-alkyl, $C_1$–$C_4$-alkyl or halogen atoms substituted, $R_6$, $R_7$ and $R_8$ = hydrogen, methyl, ethyl, methoxy, $SO_3H$ or COOH, at least one of these radicals being $SO_3H$ or COOH,
a = 1 to 3,
b = 1 to 2,
c = 1 and
a + b + c = 3 to 4.

2. Phthalocyanine reactive dyestuffs of the formula

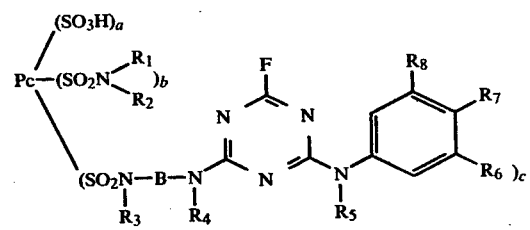

wherein
Pc = the radical of a copper phthalocyanine or nickel phthalocyanine,
$R_1$, $R_2$, $R_3$ and $R_4$ = hydrogen, methyl or ethyl,
$R_5$ = hydrogen,
B = 1,2-phenylene, 1,3-phenylene, 1,4-phenylene or $C_2$–$C_6$-alkylene (straight-chain or branched), optionally substituted by $C_1$–$C_4$-alkyl, $C_1$–$C_4$-alkoxy or halogen atoms,
$R_6$, $R_7$ and $R_8$ = hydrogen, methyl, ethyl, methoxy, $SO_3H$ or COOH, at least one of these radicals being $SO_3H$ or COOH,
$1 < a < 3$,
$b < 0$,
c = 1 and
a + b + c = 3 or 4.

3. Phthalocyanine reactive dyestuffs of the formula

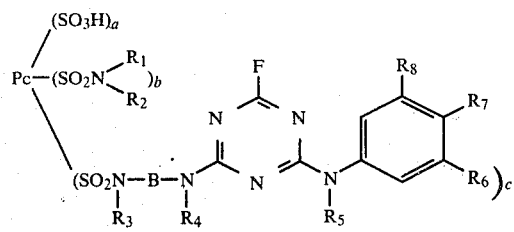

wherein
Pc = the radical of a copper phthalocyanine or nickel phthalocyanine, $R_3$ and $R_4$ = hydrogen, methyl or ethyl,
$R_5$ = hydrogen,
B = 1,2-phenylene, 1,3-phenylene, 1,4-phenylene or $C_2$–$C_6$-alkylene (straight-chain or branched), optionally substituted by $C_1$–$C_4$-alkyl, $C_1$–$C_4$-alkoxy or halogen atoms,
$R_6$, $R_7$ and $R_8$ = hydrogen, methyl, ethyl, methoxy, $SO_3H$ or COOH, at least one of these radicals being $SO_3H$ or COOH,
a = 1 or 2,
b = 1,
c = 1 and
a + c = 2 or 3.

* * * * *

UNITED STATES PATENT AND TRADEMARK OFFICE
CERTIFICATE OF CORRECTION

PATENT NO. : 4,267,107
DATED : May 12, 1981
INVENTOR(S) : Manfred Groll

It is certified that error appears in the above-identified patent and that said Letters Patent are hereby corrected as shown below:

Column 20, line 65    Delete "$b<0$" and insert --$b>0$--.

Signed and Sealed this

Twenty-seventh Day of October 1981

[SEAL]

Attest:

GERALD J. MOSSINGHOFF

Attesting Officer    Commissioner of Patents and Trademarks